United States Patent
Han et al.

(10) Patent No.: US 11,421,906 B2
(45) Date of Patent: Aug. 23, 2022

(54) METHOD FOR CONTROLLING AIR CONDITIONER BY RECOGNIZING ZONE ON BASIS OF ARTIFICIAL INTELLIGENCE, SERVER AND AIR CONDITIONER

(71) Applicant: LG Electronics Inc., Seoul (KR)

(72) Inventors: Dongwoo Han, Seoul (KR); Taeyup Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/058,420

(22) PCT Filed: May 17, 2019

(86) PCT No.: PCT/KR2019/005940
§ 371 (c)(1),
(2) Date: Nov. 24, 2020

(87) PCT Pub. No.: WO2019/225912
PCT Pub. Date: Nov. 28, 2019

(65) Prior Publication Data
US 2021/0215373 A1    Jul. 15, 2021

(30) Foreign Application Priority Data

May 24, 2018   (KR) ......................... 10-2018-0059298

(51) Int. Cl.
*F24F 11/62* (2018.01)
*F24F 11/64* (2018.01)
(Continued)

(52) U.S. Cl.
CPC .............. *F24F 11/64* (2018.01); *F24F 11/58* (2018.01); *F24F 11/79* (2018.01); *G05B 15/02* (2013.01); *F24F 2120/12* (2018.01)

(58) Field of Classification Search
USPC ......................................................... 700/277
See application file for complete search history.

(56) References Cited

U.S. PATENT DOCUMENTS

2003/0096572 A1    5/2003   Gutta et al.
2010/0168922 A1*   7/2010   Park ......................... F24F 11/30
                                                          700/276
(Continued)

FOREIGN PATENT DOCUMENTS

CN         102679493         9/2012
EP          2971987          1/2016
(Continued)

OTHER PUBLICATIONS

Extended European Search Report in European Appln. No. 19807767.9, dated Feb. 15, 2022.

*Primary Examiner* — Emilio J Saavedra
(74) *Attorney, Agent, or Firm* — Fish & Richardson P.C.

(57) ABSTRACT

An air conditioner is controlled according to one or more zones determined by artificial intelligence. The air conditioner includes a controller for generating first space classification data for dividing a space into two or more blowing zones based on human body sensing data generated by a vision module and an image, and a communication unit for transmitting the human body sensing data to a server and receiving second space classification data from the server. The controller is configured to control operation of the air conditioner based on comparing the first space classification data to the second space classification data and dividing the space into a concentrated blowing zone and a non-concentrated blowing zone.

17 Claims, 9 Drawing Sheets

(51) Int. Cl.
*F24F 11/58* (2018.01)
*F24F 11/79* (2018.01)
*G05B 15/02* (2006.01)
*F24F 120/12* (2018.01)

(56) References Cited

U.S. PATENT DOCUMENTS

| | | | |
|---|---|---|---|
| 2010/0168923 A1* | 7/2010 | Park | F24F 11/79 |
| | | | 700/278 |
| 2010/1068923 | 7/2010 | Park et al. | |
| 2011/0189938 A1* | 8/2011 | Yoshii | F24F 11/0001 |
| | | | 454/256 |
| 2014/0277757 A1 | 9/2014 | Wang | |
| 2016/0195856 A1 | 7/2016 | Spero | |
| 2018/0195752 A1* | 7/2018 | Sasaki | F24F 11/80 |
| 2018/0209681 A1 | 7/2018 | Song et al. | |
| 2018/0301933 A1 | 10/2018 | Lee et al. | |

FOREIGN PATENT DOCUMENTS

| | | | |
|---|---|---|---|
| EP | 3379163 | | 9/2018 |
| JP | 2008281241 | | 11/2008 |
| JP | 2011158157 | | 8/2011 |
| JP | 2017048930 A | * | 3/2017 |
| KR | 20090087365 | | 8/2009 |
| KR | 20090087365 A | * | 8/2009 |
| KR | 20100076559 | | 7/2010 |
| KR | 101072399 | | 10/2011 |
| KR | 101569414 | | 11/2015 |
| KR | 20180051729 | | 5/2018 |
| KR | 20180071031 | | 6/2018 |

\* cited by examiner

METHOD FOR CONTROLLING AIR CONDITIONER BY RECOGNIZING ZONE ON BASIS OF ARTIFICIAL INTELLIGENCE, SERVER AND AIR CONDITIONER

CROSS-REFERENCE TO RELATED APPLICATIONS

This application is a National Stage application under 35 U.S.C. § 371 of International Application No. PCT/KR2019/005940, filed on May 17, 2019, which claims priority under 35 U.S.C. 119(a) to Patent Application No. 10-2018-0059298, filed in the Republic of Korea on May 24, 2018. The disclosures of the prior applications are incorporated by reference in their entirety.

TECHNICAL FIELD

The present disclosure relates to a method for controlling an air conditioner based on one or more zones determined by artificial intelligence, a server, and an air conditioner.

BACKGROUND

An air conditioner may provide a comfortable indoor environment to humans by discharging cooled and heated air to an indoor space to adjust an indoor temperature. In some cases, an air conditioner may provide a comfortable indoor environment by purifying indoor air.

In some examples, the air conditioner includes an indoor unit installed in an indoor space, and an outdoor unit including a compressor, and a heat exchanger, and the like, to supply the refrigerant to the indoor unit.

In some cases, the indoor unit and the outdoor unit can be controlled separately. In some cases, the air conditioner can include at least one indoor unit connected to the outdoor unit, and may be operated in a cooling or heating mode by supplying a refrigerant to the indoor unit depending on a requested operation state.

In some cases, cooled or heated air may be discharged only to a space where a user is positioned. In this case, the position of the user may need to be accurately recognized. In some cases, information other than the position of the user can be used to set an operation mode appropriate for the space.

For example, an air conditioner may be controlled by an operating method where a human body is sensed, and, as a result of sensing, an amount and a direction of air are controlled once. In some cases, the air conditioner provides no function of recognizing a space. In some examples, where the air conditioner controls an amount and a direction of air only once, the air conditioner may not provide cooling or heating efficiently if a human body is sensed inaccurately.

SUMMARY

The present disclosure describes an air conditioner that can improve cooling or heating efficiency based on the positions or number of occupants and the like.

The present disclosure describes an air conditioner that can recognize an activity zone in a space to operate.

The present disclosure describes an air conditioner in which each of the server and the air conditioner can recognize an activity zone and operate as a result of accurate recognition.

The present disclosure describes an air conditioner that can increase or decrease an amount of data to be transmitted and received or transmission frequency of the same depending on the number of a plurality of connected air conditioners to reduce a communication load, when the plurality of air conditioners transmit information to the server based on communication, thereby ensuring improvement in communication efficiency.

According to one aspect of the subject matter described in this application, an air conditioner includes a vision module that includes a camera configured to capture an image of a space in which the air conditioner is located and that is configured to generate human body sensing data from the image captured by the camera, a controller configured to generate first space classification data for classifying the space into two or more blowing zones based on the human body sensing data and the image, and a communication unit configured to transmit the human body sensing data to a server and to receive second space classification data from the server. The controller is configured to, based on comparing the first space classification data with the second space classification data, determine a first blowing zone and a second blowing zone of the space and control operation of the air conditioner according to the first blowing zone and the second blowing zone.

Implementations according to this aspect may include one or more of the following features. For example, the communication unit can accumulate and store the human body sensing data generated by the vision module, and transmit the accumulated human body sensing data to the server based on an amount of the accumulated human body sensing data in the communication unit being equal to a data transmission unit. In some examples, the communication unit can be configured to receive a value corresponding to the data transmission unit from the server, where the value can be determined based on a number of air conditioners that access the server and transmit human body sensing data to the server.

In some implementations, the controller can be configured to, based on an amount of data transmitted by the communication unit to the server being less than a server determination threshold, determine the first blowing zone and the second blowing zone using the first space classification data. In some implementations, the controller can be configured to, based on an amount of data transmitted by the communication unit to the server being greater than or equal to a server determination threshold, compare the first space classification data with the second space classification data, and based on a difference between the first space classification data and the second space classification data being less than or equal to a predetermined level, determine the first blowing zone and the second blowing zone using the second space classification data.

In some implementations, the controller can be configured to accumulate the human body sensing data, and based on an amount of the accumulated human body sensing data being greater than or equal to a self-determination threshold, determine the first blowing zone and the second blowing zone using the first space classification data. In some implementations, the air conditioner can include an interface configured to receive an initialization instruction for deleting (i) the human body sensing data, the first space classification data, or the second space classification data that are stored in the air conditioner, and (ii) the human body sensing data or the second space classification data that are stored in the server. The controller can be configured to, in response to the initialization instruction, delete the human body sensing data, the first space classification data, or the second space classification data that are stored in the air conditioner. The communication unit can be configured to, in response to the initialization instruction, transmit a message for requesting deletion of the human body sensing data or the second space classification data that are stored in the server.

According to another aspect, a server includes a communication unit configured to receive human body sensing data from a plurality of air conditioners based on an amount of the human body sensing data being equal to a data transmission unit, a controller configured to generate space classification data for classifying a space, in which each of the plurality of air conditioners is located, into two or more blowing zones based on the received human body sensing data, and a storage configured to store the human body sensing data or the space classification data. The communication unit is configured to transmit the space classification data to the plurality of air conditioners.

Implementations according to this aspect may include one or more of the following features. For example, the controller can be configured to determine a value corresponding to the data transmission unit based on a number of the air plurality of conditioners that transmit the human body sensing data to the server. The communication unit can be configured to transmit the value corresponding to the data transmission unit to the plurality of air conditioners based on predetermined intervals or based on an increase or a decrease of the number of the plurality of air conditioners that transmit the human body sensing data to the server.

In some implementations, the controller can be configured to, based on an amount of data received by the communication unit from an air conditioner among the plurality of air conditioners being greater than or equal to a server determination threshold, generate the space classification data corresponding to the air conditioner. In some examples, the communication unit can be configured to receive, from an air conditioner among the plurality of air conditioners, a message for requesting deletion of stored data in the storage, and the controller can be configured to delete the stored data corresponding to the air conditioner from the storage.

According to another aspect, a method for controlling an air conditioner includes generating human body sensing data from an image captured by a camera that is included in a vision module of the air conditioner and configured to capture one or more images of a space in which the air conditioner is located, a generating, by a controller of the air conditioner, first space classification data for classifying the space into two or more blowing zones based on the human body sensing data and the image, transmitting, by a communication unit of the air conditioner, the human body sensing data to a server, and receiving second space classification data from the server, comparing, by the controller, the first space classification data with the second space classification data, and based on comparison of the first space classification data with the second space classification data, determining a first blowing zone and a second blowing zone of the space, and controlling operation of the air conditioner according to the first blowing zone and the second blowing zone.

Implementations according to this aspect may include one or more of the following features. For example, the method can further include accumulating and storing, by the communication unit, the human body sensing data, and based on an amount of the accumulated human body sensing data being equal to a data transmission unit, transmitting the accumulated human body sensing data from the communication unit to the server.

In some implementations, the method can include determining, by the server, a value corresponding to the data transmission unit based on a number of two or more air conditioners that access the server and transmit human body sensing data, and receiving, by the communication unit, the value from the server. In some implementations, the method can include determining an amount of data transmitted by the communication unit to the server, and based on the amount of the data transmitted by the communication unit to the server being less than a server determination threshold, determining the first blowing zone and the second blowing zone using the first space classification data.

In some implementations, the method can include determining an amount of data transmitted by the communication unit to the server, based on the amount of the data transmitted by the communication unit to the server being greater than or equal to a server determination threshold, comparing the first space classification data with the second space classification data, and based on a difference between the first space classification data and the second space classification data being less than or equal to a predetermined level, determining the first blowing zone and the second blowing zone using the second space classification data.

In some implementations, the method can include accumulating, by the controller, the human body sensing data, and based on an amount of the accumulated human body sensing data being greater than or equal to a self-determination threshold, determining the first blowing zone and the second blowing zone using the first space classification data. In some examples, the method can include receiving, by an interface, an initialization instruction for deleting (i) the human body sensing data, the first space classification data, or the second space classification data that are stored in the air conditioner, and (ii) the human body sensing data or the second space classification data that are stored in the server, in response to the initialization instruction, deleting, by the controller, the human body sensing data, the first space classification data, or the second space classification data that are stored in the air conditioner, and in response to the initialization instruction, transmitting, from the communication unit, a message for requesting deletion of the human body sensing data or the second space classification data that are stored in the server.

In some implementations, each of the first space classification data and the second space classification data can include at least one of a distance between the air conditioner and each of the first blowing zone and the second blowing zone, or a span angle of each of the first blowing zone and the second blowing zone with respect to the air conditioner. In some implementations, the method includes operating one or more blowers to blow air to the first blowing zone and the second blowing zone in different air speeds.

In some implementations, the air conditioner can improve cooling or heating efficiency based on the positions or number of occupants and the like and recognize an activity zone in a space to operate without an additional operation.

In some implementations, the server and the air conditioner can recognize an activity zone in a space.

In some implementations, the air conditioner can increase or decrease an amount of data to be transmitted and received or transmission frequency of the same depending on the number of a plurality of connected air conditioners to reduce a communication load, when the plurality of air conditioners transmit information based on communication, thereby ensuring improvement in communication efficiency.

Effects of the present disclosure are not limited to the above ones. One having ordinary skill in the art can easily draw various effects from the configuration in the disclosure.

DETAILED DESCRIPTION

Figure 1:
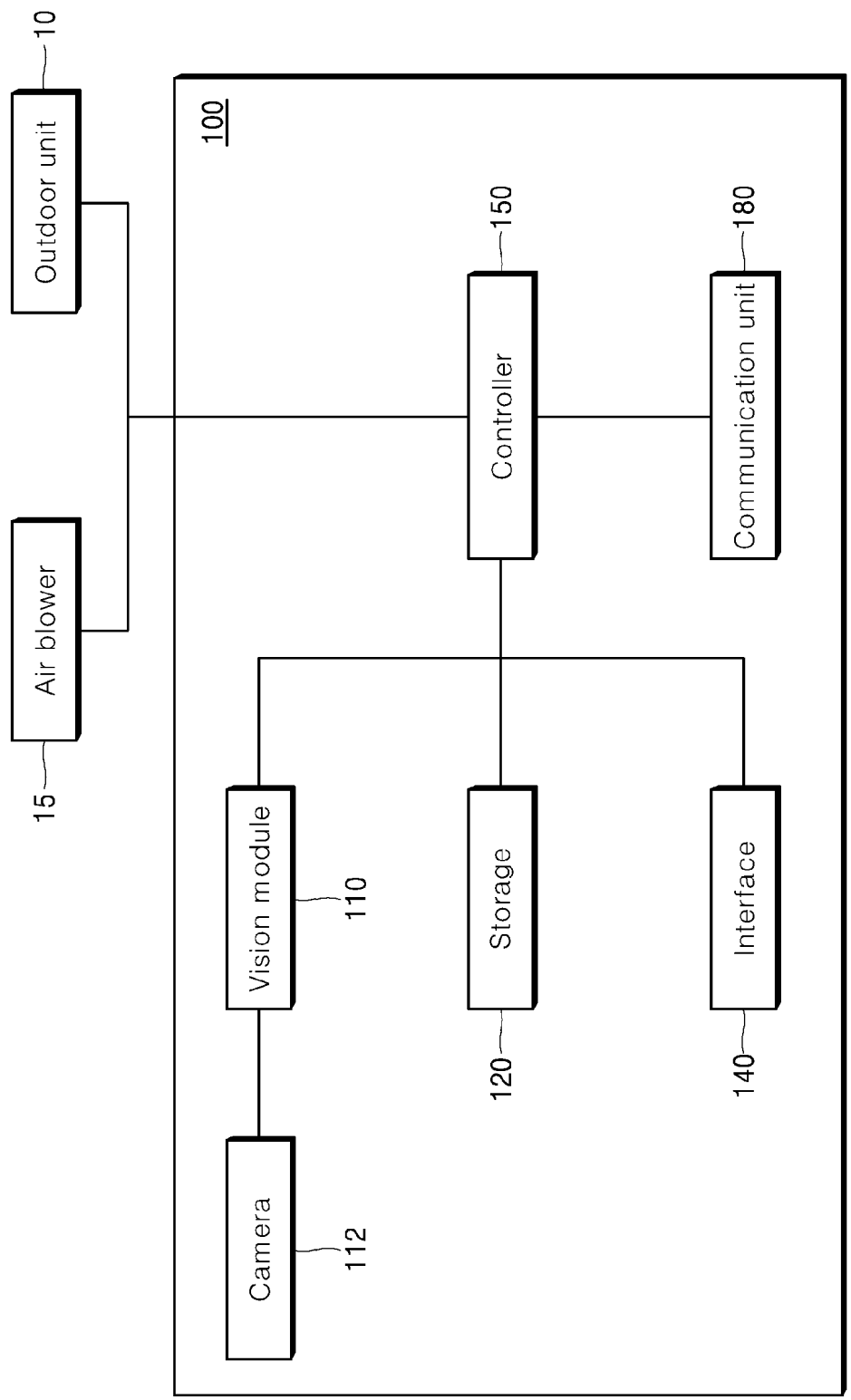
FIG. 1 is a view showing an example of an air conditioner.

Hereinafter, one or more implementations of the present disclosure will be described in detailed with reference to the accompanying drawings so that those skilled in the art can easily carry out the present disclosure. The present disclosure is not limited to the implementations disclosed herein but can be implemented in various different forms.

In order to clearly describe the implementations, the description irrelevant to the implementations has been omitted. Same or like reference numerals designate same or like components throughout the specification. Further, some implementations will be described in detail with reference to the illustrative drawings. Regarding the reference numerals assigned to the components in the drawings, it should be noted that the same components will be designated by the same reference numerals, wherever possible, even though they are shown in different drawings. Furthermore, in relation to describing the present disclosure, the detailed description of well-known related configurations or functions can be omitted when it is deemed that such description can cause ambiguous interpretation of the present disclosure.

In some implementations, components of the air conditioner can be classified into an outdoor unit 10 and an indoor unit. In some examples, an air conditioning system can include one or more outdoor units and one or more indoor units. A relationship between the numbers of the outdoor units and the indoor units can be 1:1, 1:N, or M:1 (N and M are natural number and both are larger than 1).

The present disclosure can be applied to various devices that control cooling or heating. However, for convenience of explanation, the explanation will be focused on cooling. When applied to heating, the implementations of the present disclosure can be applied to a process for increasing a temperature and a mechanism for maintaining the increased temperature.

In the present disclosure, the implementations will be described mainly with respect to cooling, but can be applied to heating in the same or similar way.

The present disclosure describes a link or cooperation between a server and an air conditioner for recognition of an actual activity zone to control the air conditioner. To enhance efficiency of cooling or heating of the air conditioner and provide a more pleasant environment to the user, recognition of an actual activity zone where the user resides can be implemented based on a link between an inside of the product and the server. In some cases, where an algorithm is implemented only in the air conditioner, an amount of data processed by the air conditioner may be limited, and additional learning of an algorithm may result in a heavy load on the calculation ability of the air conditioner. Accordingly, when the air conditioner transmits human body position information to the server, the server can collect and classify the information and determine a zone using more data, thereby making it possible to improve reliability and update the algorithm later.

That is, depending on calculation abilities of the air conditioner, the air conditioner or the server can perform calculation and data processing.

Additionally, a space determined by the air conditioner and a space determined by the server can be compared to generate a result about a final space, leading to improvement in reliability of space recognition.

FIG. 1 is a view showing an example of an air conditioner. A vision module 110, which is a component constituting the air conditioner 100, can capture an image of objects and a space within a range where an air blower 15 of the air conditioner can blow air. The vision module 110 can include a camera 112 configured to capture an image of a space where the air conditioner is installed. The vision module 110 can process the image captured by the camera 112, and generate human body sensing data. For example, a result of calculation of a position of a human in a space, based on an angle and a distance, can be an example of the human body sensing data. A storage 120 can store certain amounts of captured images or sensing data.

The vision module 110, the camera 112, the storage 120, an interface 140, a controller 150 and a communication unit 180 in FIG. 1 can be implemented as a single processor. Alternatively, some of the components can be implemented as a single processor. Further, a single process can provide a processing function and a memory function.

The controller 150 can generate first space classification data for classifying a blowing zone into two or more based on the human body sensing data and the image generated by the vision module.

For example, the space classification data can be divided into a concentrated blowing zone and a non-concentrated blowing zone. The space classification data can include information on an angle and a distance of the concentrated blowing zone. The space classification data can also include information on an angle and a distance of the non-concentrated blowing zone.

A zone, in which a high-speed operation is performed when a user operates the air conditioner in a high-speed mode and then in a pleasant air mode like smartcare, can be an example of the concentrated blowing zone. The controller 150 can recognize a concentrated blowing zone among a plurality zones and recognize an activity zone in an indoor space, as a result of recognition of a position of an occupant. For example, the controller 150 can distinguish between an activity zone (a zone where a human stays or moves) and a non-activity zone, using the human body sensing data. Thus, the controller 150 can control air current such that the air conditioner can efficiently perform cooling or heating in the concentrated blowing zone that is the activity zone classified, thereby ensuring improvement in efficiency of cooling/heating and energy.

The controller 150 can control the air blower 15 such that the air blower 15 sends air to the concentrated blowing zone, in the process of smart care. Smart care can denote a high-speed operation in which an amount of blown air and a temperature, a direction and the like of blown air are controlled such that a temperature in a space reaches a temperature desired by the user within a short period of time when the air conditioner is first turned on or the user selects the process of smart care.

According to the present disclosure, after air is blown intensively toward the position of the occupant based on human body recognition, the temperature in the indoor space can reach a desired temperature or after a predetermined period passes, a pleasant air mode operation can be performed.

Accordingly, the controller 150 can generate classification data for distinguishing between a concentrated blowing zone and a non-concentrated blowing zone based on the human body sensing. The server can also generate the classification data.

To this end, the communication unit 180 can perform communication with an external server or an external communication device. For example, the communication unit 180 can transmit an image captured by the camera 112 or human body sensing data generated by the vision module 110 to the server and can receive second space classification data for classifying a space from the server. Alternatively, the communication unit 180 can transmit an image, captured by the camera 112, to an external communication device (a tablet, a laptop, a TV set, a smartphone and the like).

The second space classification data received by the communication unit 180 and the first space classification data generated by the controller 150 can be compared to select more accurate space classification data, and a concentrated blowing zone and a non-concentrated blowing zone can be generated, such that the controller 150 determines an amount of air blown by the air blower 15 and an angle (a vertical direction or a horizontal direction) of the blown air in the process of smartcare.

The interface 140 can provide a function of displaying a current operation state or providing a button for allowing for a turn-on/off from the outside and the like. Additionally, the interface 140 can receive an initialization instruction for deleting the human body sensing data or the space classification data stored in the air conditioner and the human body sensing data or the space classification data stored in the server from the outside (a remote controller, a user's selection of the button and the like).

Each of the components can be integrally configured or remotely disposed. Accordingly, transmission and reception of information between the components can be implemented based on wired or wireless communication or through a physical communication line. In relation to this, sending and receiving information can be referred to as transmission of information.

Figure 2:
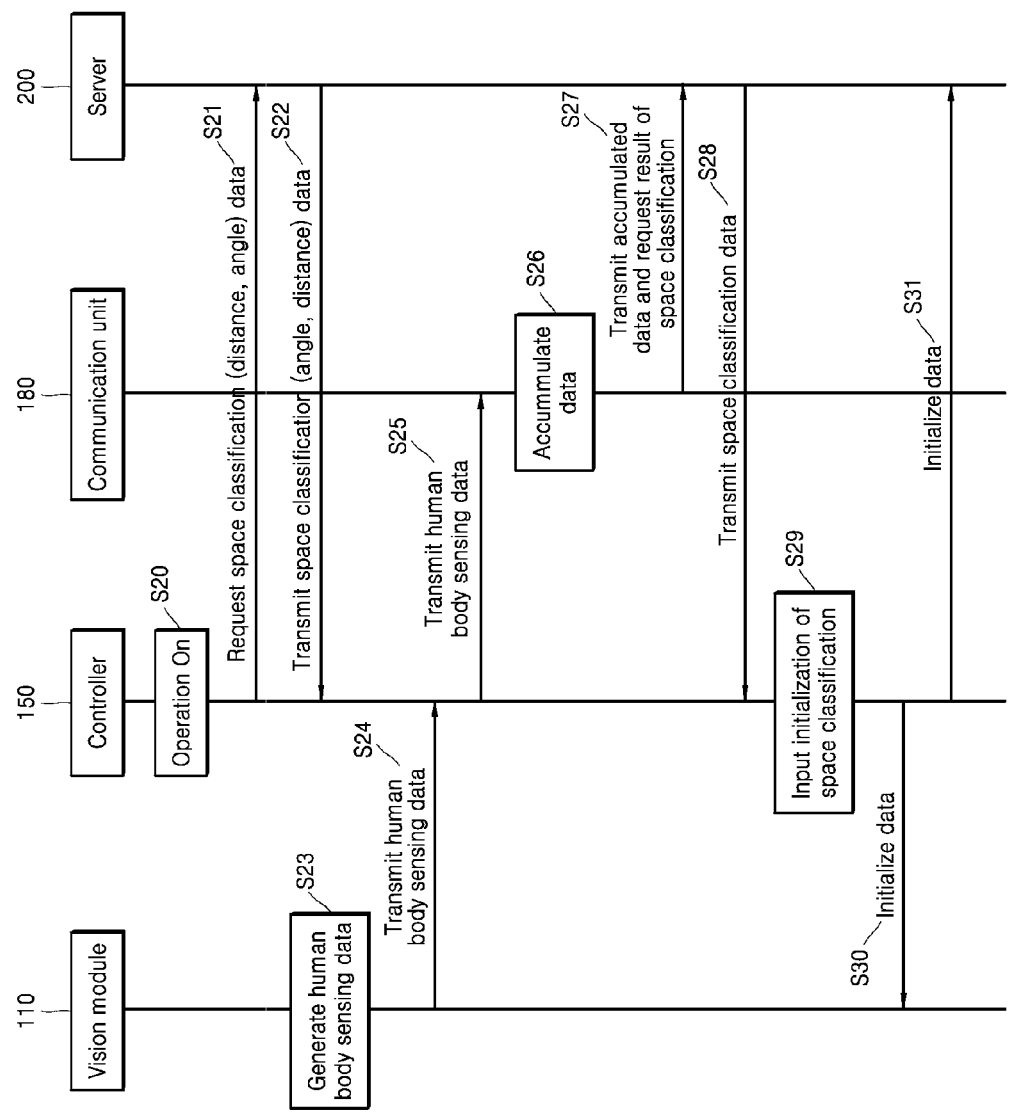
FIG. 2 is a view showing an example of a server-based space learning logic.

FIG. 2 is a view showing an example of a server-based space learning logic. The vision module 110 can provide vision information including the human body sensing data. Further, information on a space can be included in a captured image. In some examples, the server 200 can be installed at a property (e.g., a building, a house, etc.) and include one or more processors, communication devices, and non-transitory memory devices.

When the air conditioner is turned on (S20), the controller 150 can control the communication unit 180 to request, to the server 200, space classification data (a distance and an angle) for classifying a blowing zone based on sensing of an occupant in a space (S21). The communication unit 180 can use one or more of various types of communication protocols such as Wi-Fi or mobile communication and the like. The server 200 can generate space classification (a distance and an angle) data and transmit the same to the air conditioner 100, based on the human body sensing data previously transmitted or the space classification data previously generated or the human body sensing data provided by the air conditioner 100 (S22). In steps 21 to 22, the vision module 110 can generate human body sensing data (S23) and transmit the same to the controller 150 (S24). Additionally, the controller 150 can transmit human body sensing data captured by the camera 112 and generated by the vision module 110 to the communication unit 180 (S25).

The communication unit 180 can continue to accumulate data transmitted in steps 23 to 25. In the accumulation process, the communication unit 180 can use a built-in memory or can store the data in the storage 120. When predetermined numbers of data are accumulated (S26), the communication unit 180 can transmit the accumulated data to the server 200 (S27). Additionally, the communication unit can make a request to the server 200 for a result of the transmission of the accumulated data and the sensing of the space (S27). The server 200 can transmit the data performing space sensing, based on the transmitted data (S28). The controller 150 can distinguish a concentrated blowing zone and a non-concentrated blowing zone for smartcare and can blow air, based on the transmitted data.

When the interface 140 receives an instruction for initializing space classification (S29), the controller 150 can give an instruction for initializing data to the vision module 110 and the server 200, based on the instruction for initializing space classification (S30 and S31).

In some implementations, as shown in FIG. 2, a vision module, which is an example of the vision module 110, can transmit position information of a sensed human body to the controller 150 (S24), and the controller 150 can transmit the information to a Wi-Fi module, which is an example of the communication unit 180, and can store the data (S25 and S26).

When predetermined numbers (the number of a) of the human body position data are accumulated, the communication unit 180 can transmit the accumulated human body position data to the server (S26 to S27). The number (a) can be a unit of the human body sensing data transmitted by the communication unit 180 to the server 200.

The communication unit 180 can accumulate and store the human body sensing data generated by the vision module 110, and, when the magnitude or number of the accumulated data reaches a data transmission unit (a), can transmit the accumulated data to the server 200 and help to prevent a load from affecting access of the server 200 communicating with a large number of air conditioners.

The data transmission unit (a) can be previously determined or the server 200 can flexibly change the data transmission unit (a) and transmit the data transmission unit (a) to the air conditioner 100. That is, the communication unit 180 can receive the value from the server 200. The value a can be inversely proportional to the number of two or more air conditioners that access the server 200 and transmit the human body sensing data.

For example, when a large number of air conditioners access the server 200 currently or transmit human body sensing data to the server currently, the server 200 can increase the unit a of transmission of the human body sensing data to allow the air conditioner 100 to sporadically transmit data, thereby removing a bottleneck of a communication connection.

When a large number of air conditioners access the server 200 currently or transmit human body sensing data to the server 200 currently, the server 200 can decrease the unit a of transmission of the human body sensing data and control the air conditioner 100 such that the air conditioner 100 transmit data more rapidly and frequently as the server 200 communicates and processes data within a short period of time, thereby making it possible to generate space classification data in real time.

The server 200 having stored data sent by the communication unit 180 can input the data to an algorithm to generate space classification data (space sensing information or space classification information) when the number of the data reaches a predetermined number M (a server determination unit).

For example, the communication unit 180 can request space classification data each time the communication unit 180 uploads position information to the server (S27), while the server 200 may not send space classification data until an algorithm is applied to the M number of collected data.

Then space information drawn from the server 200 can be delivered to the controller 150 through the communication unit 180 (S28). When a space classification data initialization button on the interface 140 is pressed or selected, and the air conditioner 100 receives an initialization instruction (S29), the information can be delivered to the vision module 110 and the server 200, and, at the same time, the data can be initialized (S30 and S31). That is, the controller 150 can delete the human body sensing data or the space classification data stored in the air conditioner, in response to the initialization instruction.

Additionally, the controller 150 can control the communication unit 180 such that the communication unit 180 transmits, to the server 200, a message for requesting deletion of the stored data. In the case of a change of the place of the indoor unit of the air conditioner, a change in the position of the indoor unit of the air conditioner, and the like, the user can select initialization.

The server 200 can delete the oldest data in the data transmission unit (a) to keep the data at a predetermined level when the number of data of an individual air conditioner managed by the server 200 reaches greater than M.

In some examples, when the magnitude or number of the data transmitted by the communication unit 180 to the server 200 does not reach the server determination unit or threshold (M), the server 200 may not have stored enough data to generate space classification data. In this case, the air conditioner can distinguish between a concentrated blowing zone and a non-concentrated blowing zone using the space classification data generated by the air conditioner itself to control operation of the air conditioner. Detailed description in relation to this is provided with reference to FIG. 3.

Figure 3:
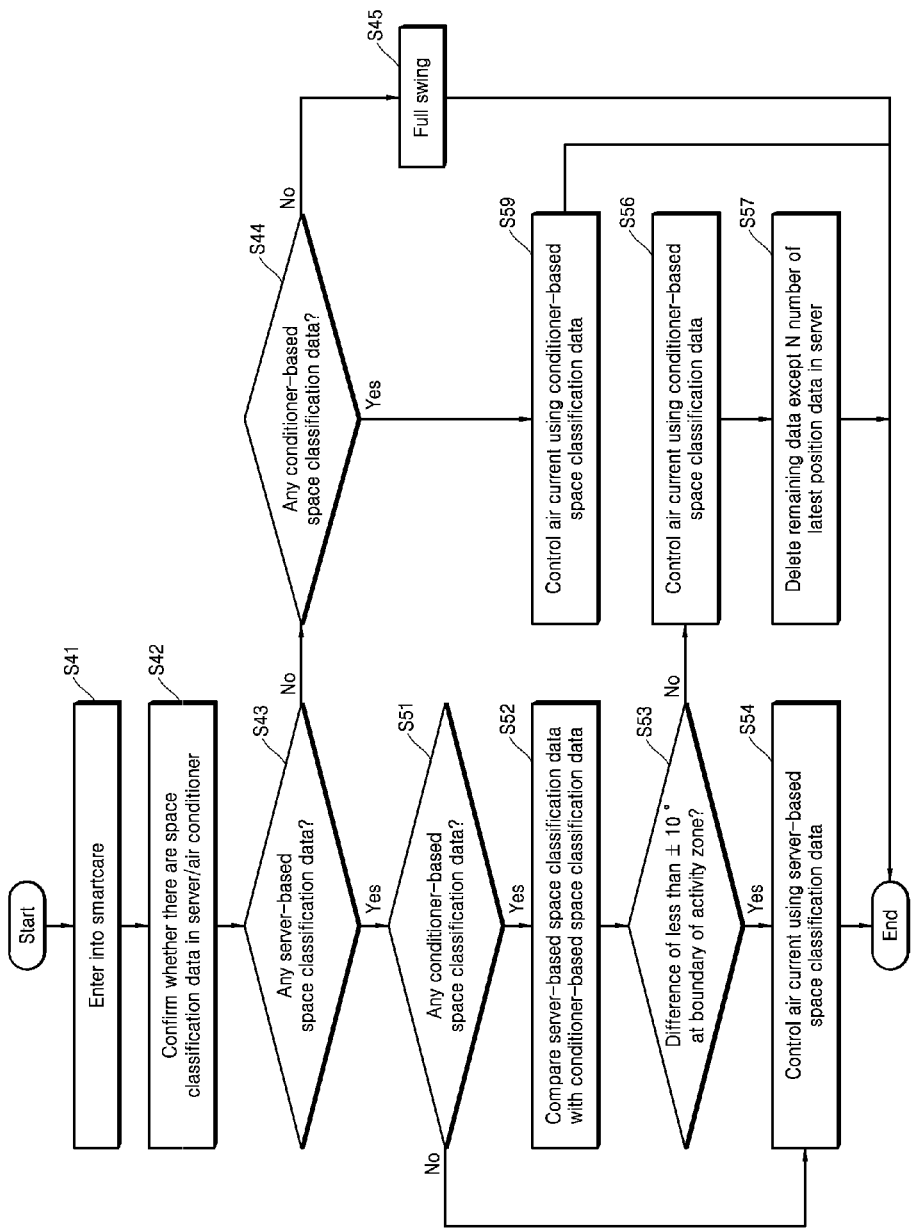
FIG. 3 is a view showing an example of a logic in performing space learning.

FIG. 3 is a view showing an example of a logic in performing space learning. FIG. 3 shows a control process depending on whether there is space classification data (space information) classified by the air conditioner 100 and space classification data classified by the server 200.

As the air conditioner 100 enters into a smartcare state (S41), the controller 150 can confirm whether there is space classification information in the server 200 or the air conditioner (a product) (S42). For example, the communication unit 180 can receive the space classification information (the space classification data) possessed by the server, and the controller 150 can confirm the space classification data possessed by the air conditioner. Then the controller can control air current based on a more reliable result after comparison between the results of confirmation.

When a difference is at a predetermined level or below as a result of confirmation, the controller 150 can apply the space classification data received from the server to control a direction of air current. When the difference is at the predetermined level or above, the controller 150 can use the space classification data generated by the air conditioner to control the direction of air current. Additionally, when the controller controls the direction of air using the space classification data of the air conditioner after the comparison, the server can delete previous data while keeping an N (a self-determination unit) number of latest data among the data (e.g., the unit M of determination of the server) possessed by the server. Thus, the server can only store reliable data. Then the controller 150 can collect space classification data from the server 200 again. Description in relation to this is provided hereunder.

When there is no server-based space classification data as a result of confirmation (S43), the controller 150 can confirm whether there is conditioner-based information (space classification data) stored in the air conditioner (S44). In case there is no the conditioner-based space classification data, either, the controller 150 can perform a full swing in a state where a minimum amount of data for classifying a space is not collected (S45).

When there is the conditioner-based space classification information instead of the server-based information (space classification data) in step 44, the controller 150 can control air current based on the information (S59). For example of determination in step 43 and step 44, the controller 150 can use first space classification data generated by the air conditioner to distinguish between a concentrated blowing zone and a non-concentrated blowing zone, and can control operation of the air conditioner, when the magnitude or the number of data transmitted by the communication unit 180 to the server 200 does not reach the server determination unit (M).

In some examples, when there is the server-based information instead of the conditioner-based information in step 43, abnormalities may occur to the memory of the controller 150 or the storage 120, constituting the conditioner. Accordingly, the controller 150 can control air current based on the server-based space classification data (S54).

When there are both the server-based and conditioner-based space classification data based on S43 and S51, the controller 150 can compare a difference in angles at left and right boundaries of an activity zone of the two space classification data (S52). When there is a difference of predetermined magnitude, e.g., less than 10 degrees at both the boundaries as a result of comparison, the controller 150 can determine that the server-based space classification data is more reliable than the conditioner-based space classification data, and can control air current based on the result of the server (S56).

In determination in S53, when the magnitude or the number of data transmitted by the communication unit 180 to the server 200 reaches the server determination unit (M), the controller 150 can compare first space classification data generated by the conditioner, and second space classification data generated by the server. Then when there is a difference at a predetermined level (an angle, a distance and the like) or below, the controller 150 can distinguish between a concentrated blowing zone and a non-concentrated blowing zone using the second space classification data generated by the server and can control operation of the air conditioner.

When there is a difference of 10 degrees or greater at any one of the two boundaries as a result of confirmation in step 52, the controller 150 can determine that indoor space classification data is changed (movement of furniture and the like). Accordingly, the controller 150 can control air current using the air conditioner-based space classification data (S56), and can delete the data except the N number of latest data and collect data for driving of an algorithm again in the server for new learning (S57).

When a configuration as in FIG. 3 is applied, in existing space learning, a product can be equipped with an algorithm and can reflect features of a space where the product is currently installed to solve the problem that an update for improvement in the algorithm is impossible after sales.

In some cases, where an algorithm is only used for control in the air conditioner, a limited amount of data can be input to the algorithm. Accordingly, when the data are used to classify a space, reliability may not be ensured. When a large amount of data in the server is used to classify a space, a belated response to a change in the features can be made.

In some cases, where information on results of human body sensing is delivered to the server each time the information is sensed when space learning is implemented based on a link of the server, a large number of air conditioners can deliver the information to the server at the same time. Accordingly, a load can be applied to the server in processing the information.

In some implementations, where operations based on the information stored in the server and the air conditioner as in FIG. 3, reliability as well as a speed of processing can improve.

That is, an algorithm for space learning can be implemented in the air conditioner 100, and the server 200 can be equipped with the algorithm capable of classifying a space based on results of human body sensing (position information) received from the air conditioner 100.

Thus, the algorithm's ability of the air conditioner 100 and the server 200 to classify a space can improve, and, when the server algorithm is replaced, an air conditioner can also operate based on the improved algorithm even after sales.

In some examples, unlike the algorithm of the air conditioner 100, the algorithm of the server 200 may use an extensive storage space. Accordingly, a magnitude of data, which can be stored in the server 200, may be barely limited. Thus, the server 200 can classify a space using more amounts of data and ensure a high reliability of results of the algorithm.

When comparing results of space classification of the algorithms installed in the air conditioner 100 and the server 200 based on data and a difference between the results is at a predetermined level or above, the controller 150 can determine that an environment where the air conditioner 100 is installed is changed and can control the air conditioner such that the air conditioner operates based on a result of performance of the algorithm installed in the air conditioner 100. Thus, the air conditioner can have the same speed of response as an air conditioner in which a space classification algorithm is installed only in the air conditioner 100.

That is, the controller 150 can compare a result of space classification determined using the N number (e.g., 5,000), i.e., the self-determination unit, of data stored in the air conditioner 100, and a result of space classification determined using the M number (greater than N, e.g., 10,000) of data stored in the server 200, and can select any one of the two results where the difference is a predetermined angle or greater and is not, to determine a zone that is actually used. Alternatively or in addition, the controller 150 can select a median value or an average of the two results and the like to determine a zone that is actually used.

In some implementations, when the magnitude or number of data accumulated in the conditioner reaches the self-determination unit or threshold (N), the controller 150 can put priority on the first space classification data. The self-determination unit (N) can be the number of data or the magnitude of data.

Further, the communication unit 180 can collect a predetermined amount of information on a position of a sensed human body and delver the same at a time. Accordingly, a communication load applied to the server 200 can be reduced.

Figure 4:
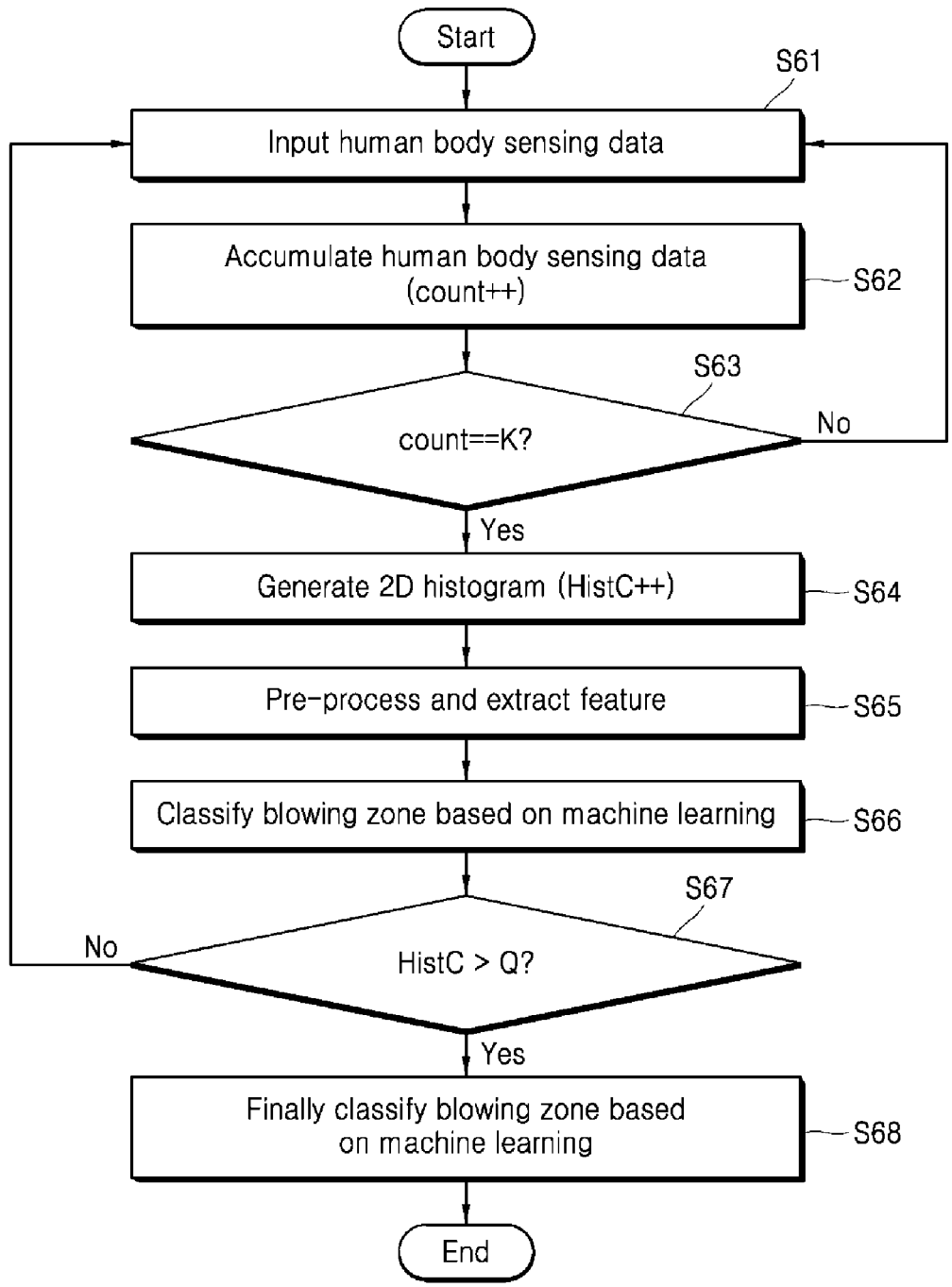
FIG. 4 is a flow chart showing an example of a process for recognizing a blowing zone.
Figure 8:
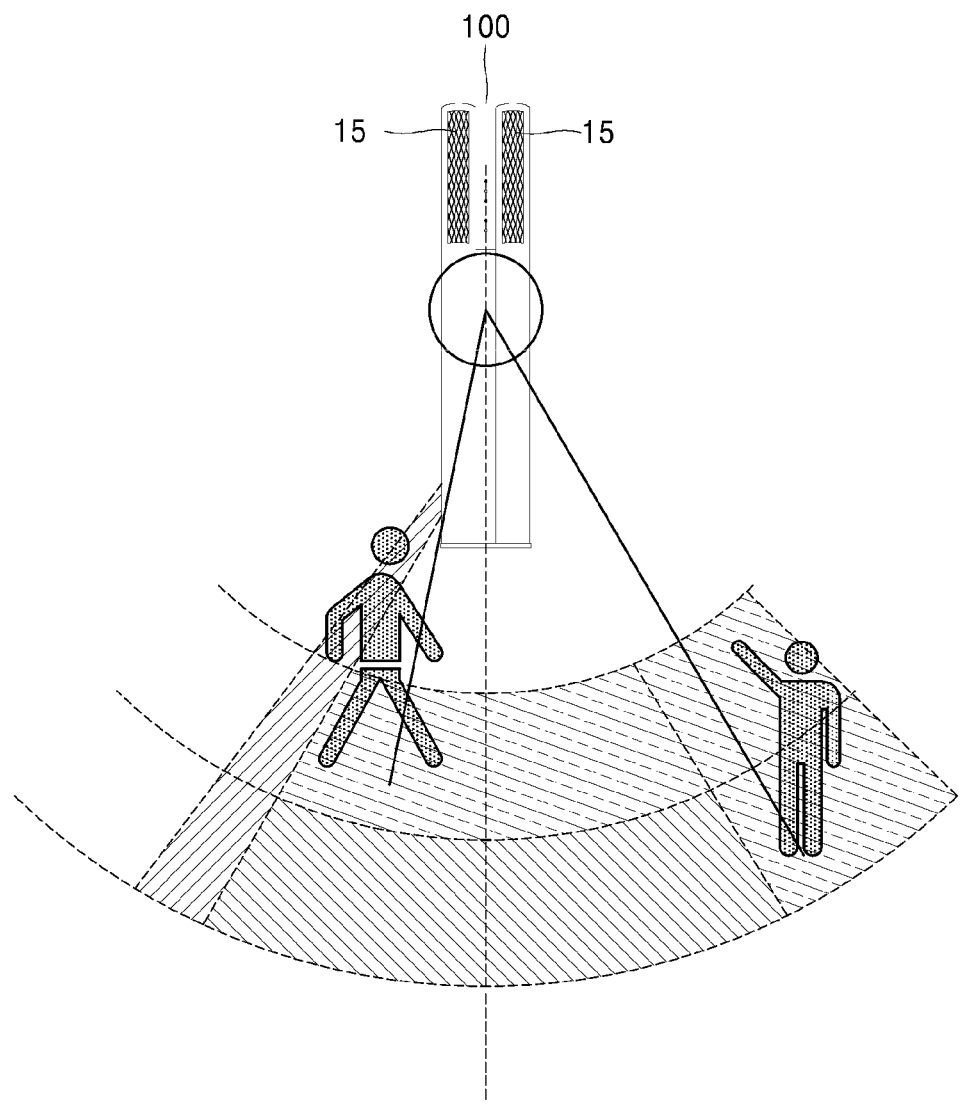
FIG. 8 is a view showing an example of space classification data.

FIG. 4 is a flowchart showing an example of a process for recognizing a blowing zone. FIG. 8 shows an example of a process in which the area vision module 110 recognizes and classifies a zone where a user is mainly positioned in the indoor space as a concentrated blowing zone.

The vision module 110 can receive human body sensing data including a result of recognizing a position of an occupant from the human body recognition unit 151 (S61), and can accumulate the received human body sensing data (S62). Here, the human body sensing data can form a reference position of the indoor unit with an angle and a distance. Distance information can be classified by a meter or centimeter in detail, or can be classified into a short distance/a medium distance/a long distance.

The vision module 110 can count the human body sensing data while accumulating the data (S63), and when a predetermined number (K) of data or more is accumulated, the vision module 110 can generate a two-dimensional histogram (S64). The two-dimensional histogram can be formed in two dimensions so as to reflect an angle and distance calculated as a result of sensing the occupant. The generation of the histogram will be described later.

Then, in order to sense a blowing zone based on the two-dimensional histogram, a preprocessing operation can be performed on each data, and a feature thereof can be extracted (S65). The controller 150 can generate space classification data by dividing the blowing zone into a plurality of zones based on the machine learning by using the generated histogram as input data (S66). In some implementations, the blowing zone can be classified into a concentrated blowing zone and a non-concentrated blowing zone.

In some implementations, the blowing zone can be sub-classified into a first concentrated blowing zone, a second concentrated blowing zone, . . . , a first non-concentrated blowing zone, a second non-concentrated blowing zone, etc. The machine learning can use techniques such as a support vector machine (SVM) and AdaBoost, and in some examples, deep learning technique. When the results are constantly accumulated (S67), a final classification result of the machine learning based blowing zone can be derived (S68).

That is, the controller 150 can include the artificial neural network pre-learned through the machine learning, and can accumulate results of recognizing a distance and direction relative to an occupant, thereby generating a histogram corresponding to the plurality of zones. The controller 150 can use the generated histogram as input data of the artificial neural network to distinguish between the concentrated blowing zone and the non-concentrated blowing zone.

In some implementations, the controller 150 can classify a zone with a large number of sensed occupants into a concentrated blowing zone and a non-concentrated blowing zone based on an accumulated histogram without additional machine learning.

In some implementations, in order to increase accuracy of the blowing zone classification, the step 65 can be repeated (S67), and on the basis of a result of collecting a plurality of classification results, a plurality of blowing zones of the indoor space can be classified into one or more concentrated blowing zones and one or more non-concentrated blowing zones (S68).

That is, when the result of the space classification is accumulated by more than a predetermined number of times, the final result can be derived, thereby securing reliability of the activity zone recognition result and eliminating a temporary error of the non-activity zone caused by a human sensing error.

Figure 5:
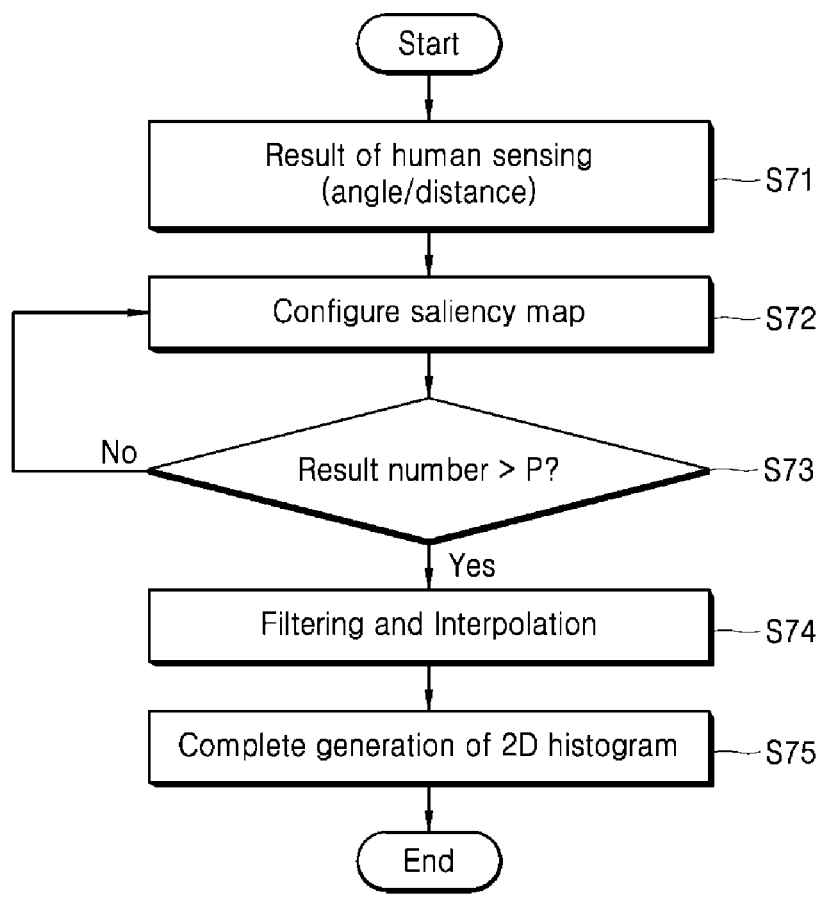
FIG. 5 is a view showing an example of a process for pre-processing data for space classification.

FIG. 5 is a view showing an example of a data preprocessing process for classifying a space.

The preprocessing operation performed in the step 65 of FIG. 5 can include largely two steps. The preprocessing operation can be performed by the vision module 110. When the vision module 110 inputs a result of sensing a human body (i.e., an angle and distance of the sensed position) to the controller 150 (S71), the controller 150 can form a saliency map (S72). In some implementations, position information (angle and distance) of the human body sensed by the vision module 110 can be quantized, and then the frequency can be updated. In this process, top, bottom, and left and right zones can be also accumulated in order to express a zone well. This process can be repeated until a reference number of (P) sensing results are input (S73).

When the process is sufficiently repeated so that the sensing results are duplicated, filtering and interpolation operations can be performed (S74). A maximum/minimum frequency value filtering and interpolation operations can be performed so as to help to prevent a sensing result from being biased in a specific angle/distance zone, thereby converting the processed data into a continuous two-dimensional histogram (S75).

The vision module 110 can recognize whether or not an occupant is present and a distance and direction relative to the occupant in an image acquired by the camera 112. The controller 150 can distinguish an activity zone with respect to a plurality of zones based on a result of recognizing the occupant.

Figure 6:
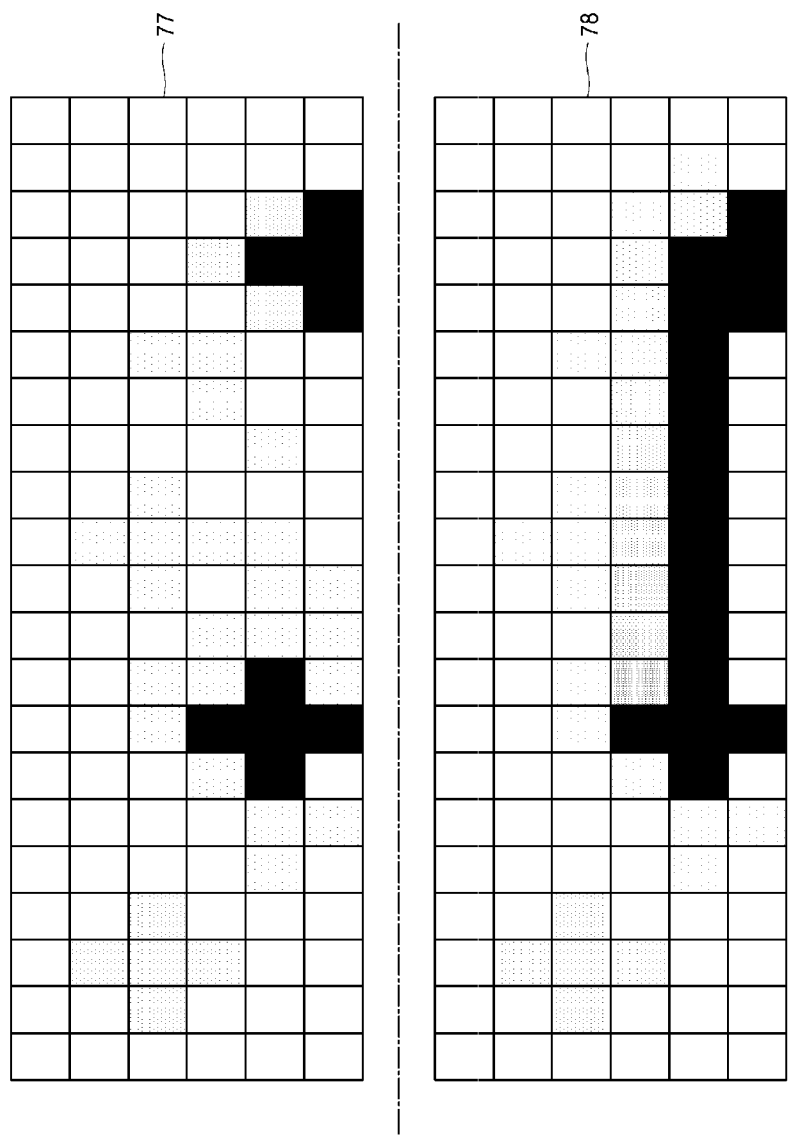
FIG. 6 is a view showing an example of a saliency map and a two-dimensional histogram.

FIG. 6 is a view showing an example of a saliency map and a two-dimensional histogram. Numeral 77 of FIG. 6 is a configuration in which the saliency map is arranged on an X-axis and a Y-axis to correspond to a distance and angle based on the saliency map. Numeral 78 shows the two-dimensional histogram generated as a result of continuous accumulation of the saliency map.

Figure 7:
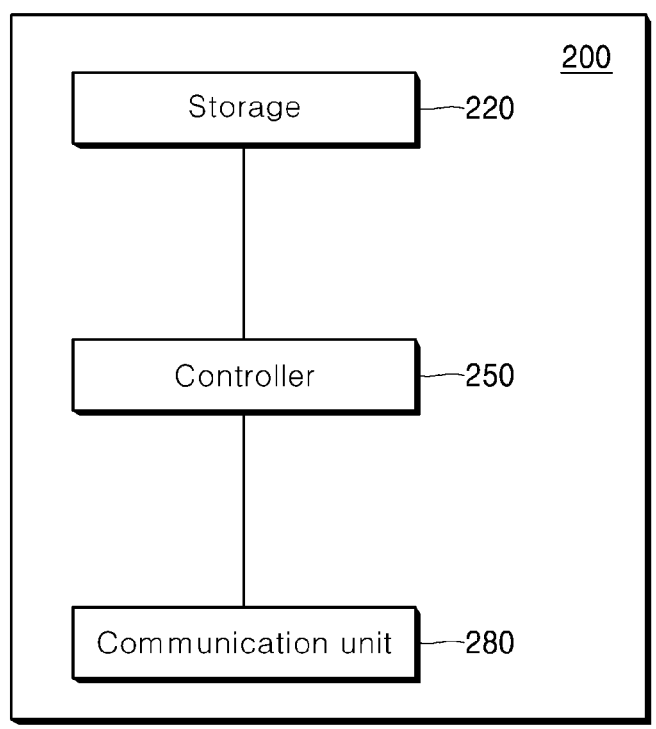
FIG. 7 is a view showing an example of a server.

FIG. 7 is a view showing an example of a server.

The server 200 can include a storage 220, a controller 250 and a communication unit 280. The communication unit 280 can receive human body sensing data respectively in the unit a of data transmission from any one of a plurality of air conditioners. The controller 250 can generate space classification data for classifying a blowing zone into two or more zones based on the received human body sensing data. In some examples, the storage 220 can include a non-transitory memory device, the controller 250 can include an electric circuit such as an integrated circuit, and the communication unit 280 can include a transmitter, a receiver, or a transceiver.

The storage 220 can store human body sensing data or space classification data. Since the server 200 provides the space classification data to the plurality of air conditioners, the storage 220 can store the space classification data or the human body sensing data together with identification information of each air conditioner.

Additionally, the communication unit 280 can transmit the space classification data to an air conditioner 100. The air conditioner 100 can determine whether to use the received space classification data as in the process of FIG. 3.

The server 200 can change the data transmission unit (a). For example, the controller 250 can set the value (a) in proportion to the number of air conditioners that transmit the human body sensing data. That is, when the number of air conditioners increase, the controller 250 can increase the value (a) to reduce frequency of communication. When the number of air conditioners decreases, the controller 250 can decrease the value (a) to increase a processing speed. The communication unit 280 can transmit the value (a) to the air conditioner at predetermined intervals or in response to an increase or a decrease in the number of air conditioners.

Further, the server 200 can accumulate a predetermined magnitude (or a predetermined number) of data from a specific air conditioner and then can generate space classification data and deliver the same to the air conditioner. For example, when the magnitude or number of data of each air conditioner provided to the communication unit 280 reaches the server determination unit (M), the controller 250 can generate space classification data in relation to the air conditioner.

When the communication unit 280 receives a message for requesting initialization, i.e., deletion of stored data from an air conditioner, the controller 250 can delete data corresponding to the air conditioner from the storage 220.

In addition, the controller 250 can consecutively delete data of a specific air conditioner from the storage 220 and allow generation space classification data based on updated data.

FIG. 8 is a view showing an example of space classification data. FIG. 8 shows an example in which a blowing zone is classified into a concentrated blowing zone, a first non-concentrated blowing zone and a second non-concentrated blowing zone, based on space classification data. When a smartcare operation is selected, an air conditioner 100 is turned on, or a concentrated blow is selected and the like, the air conditioner 100 can operate in an intensive operation mode with respect to the concentrated blowing zone defined in the space classification data, compared and selected by the controller 150, of the space classification data generated by the controller 150 or the server 200.

After operating in the intensive operation mode for a predetermined period, the air conditioner 100 can operate in the non-intensive operation mode with respect to the first non-concentrated blowing zone and the concentrated blowing zone. In some implementations, the intensive operation mode performed in this process can include a mode of allowing a temperature to quickly reach a target temperature, and the non-concentrated operation mode is a mode of controlling an operation of the air conditioner 100 according to an instruction of the controller 150 after an operation performed in the intensive operation mode is completed.

In some implementations, the air conditioner 100 can restrict airflow only to a space where the user mainly resides and control the airflow by using a result of estimating the concentrated blowing zone in the blowing zone, that is, an activity zone as a residing zone and a non-residing zone, and the blowing zone is defined in space classification data generated by the server 200 or the air conditioner 100. As a result, it is possible to restrict the airflow toward an unnecessary zone such as a wall surface, etc. and to perform a user-customized operation, thereby increasing cooling and heating efficiency and providing convenience and comfort to the user. In addition, it is possible to classify the operation mode into the intensive operation mode and the non-intensive operation mode, and thus a temperature of a main blowing space (concentrated blowing zone) can reach a target temperature in a short period of time.

In some implementations, it is possible to constantly update an algorithm independent of an installation environment to acquire information on a changed activity zone and adapt to the changed activity zone. Classifying the blowing zone can also update a position of an occupant by continuously capturing an image of an indoor space. The communication unit 192 can continuously or intermittently update the deep learning by receiving data for software upgrade from the outside so that the deep learning is updated to a deep learning module having higher accuracy.

When a difference in the space classification data of the server 200 and the air conditioner 100 is a predetermined magnitude or greater, the controller 150 can make a different choice depending on reliability of the server 200.

Although the number of data uploaded to the server 200 does not reach the server determination unit (M), the number of the data can be larger than the self-determination unit (N). In this case, the controller 150 can determine that the reliability of the generated data of the server 200 is at a predetermined level or above. Additionally, the controller 150 can produce a result of a mixture of two space classification data in a way that changes an average or a medial value, or a weight of the second space classification data generated by the server, and the first space classification data generated by the air conditioner.

The result of the mixture can include third space classification data including a concentrated blowing zone and a non-concentrated blowing zone. Thus, the vision module can determine and control a final result as a result of comparison between a result (the first space classification data) of sensing of a space based on human body sensing and a result (the second space classification data) of the server's determination based on various accumulated data, thereby improving accuracy.

Figure 9:
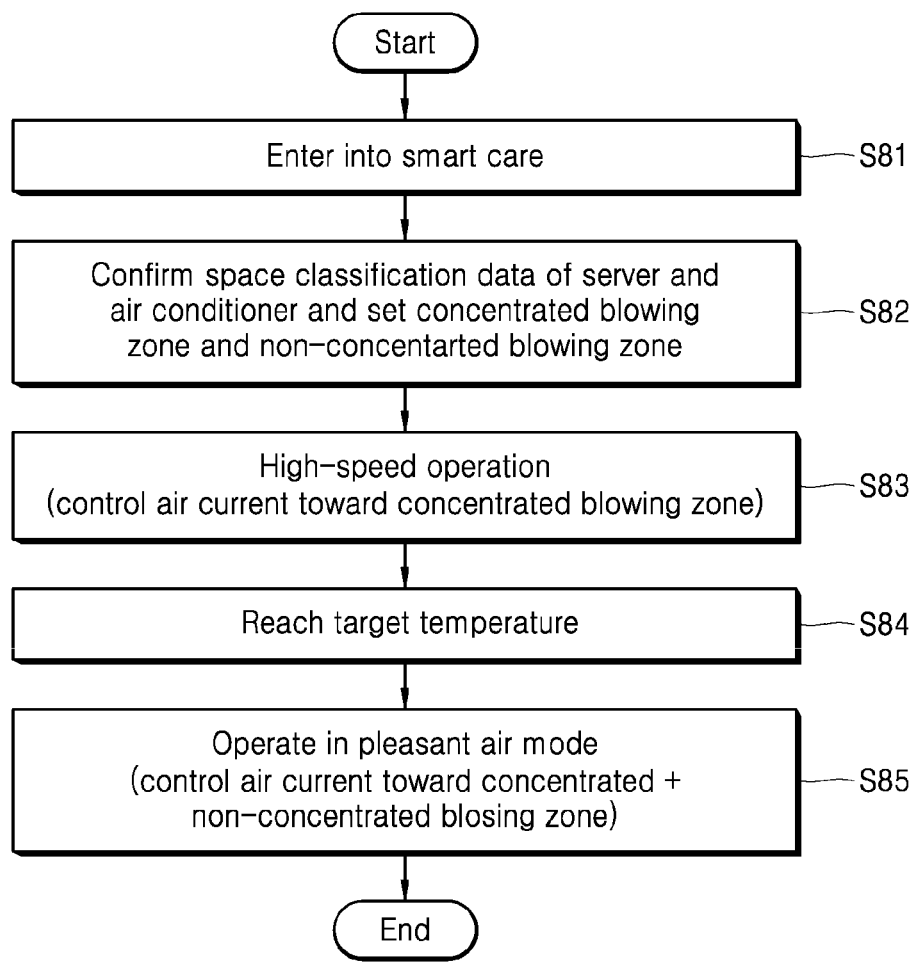
FIG. 9 is a view showing an example of a process for performing smartcare based on a cooperation between an air conditioner and a server.

FIG. 9 is a view showing an example of a process for performing smartcare based on a link between an air conditioner and a server. When the air conditioner 100 enters into a smartcare mode (S81), the controller 150 can confirm space classification data possessed by the air conditioner and space classification data received from the server. The controller 150 can select any one of them or use final space classification data, a mixture thereof, to set a concentrated blowing zone and a non-concentrated blowing zone (S82). That is, the controller 150 can compare the two sorts of classification data, use space classification data selected from them or generated as a result of a mixture of them, and distinguish between a concentrated blowing zone and a non-concentrated blowing zone to control operation of the air conditioner.

Accordingly, the controller 150 can control air current toward the concentrated blowing zone and operate (perform heating or cooling) at a high speed (S83). Then when a temperature in the space reaches a target temperature (S84), the controller 150 can allow the air conditioner to operate in a pleasant air mode (cooling or heating) (S85). In the pleasant air mode, the controller 150 can control air current towards both the concentrated zone and the non-concentrated zone.

Even though all the components of the implementation of the present disclosure are coupled as a single unit or coupled to operate as a single unit in the above description, the present disclosure is not intended to limit the implementation. That is, among the components, one or more components can be optionally coupled to operate as one or more units within the range of the disclosure. In addition, although each of the components can be implemented as an independent hardware, some or all of the components can be optionally combined with each other, so that they can be implemented as a computer program having one or more program modules for executing some or all of the functions combined in one or more hardware devices. Codes and code segments forming the computer program can be easily conceived by a person skilled in the technical field of the present disclosure. The computer program can implement the implementations of the present disclosure by being stored in a computer readable storage medium, and being read and executed by a computer. A magnetic recording medium, an optical recording medium, a storage medium including a semiconductor recording element, or the like can be employed as a storage medium of the computer program. Also, the computer program for implementing the implementations of the present disclosure can include a program module that is transmitted in real time via an external device.

The implementations have been described with reference to a number of illustrative implementations thereof. However, the present disclosure is not intended to limit the implementations set forth herein, and numerous other modifications and implementations can be devised without departing from the technical spirit of the disclosure. Thus, it should be understood that the modifications and changes are included within the range of the disclosure.

What is claimed is:

1. An air conditioner, comprising:
   a camera configured to capture an image of a space in which the air conditioner is located; and
   a controller configured to generate human body sensing data from the image captured by the camera and to generate first space classification data for classifying the space into two or more blowing zones based on the human body sensing data and the image,
   wherein the air conditioner is configured to transmit the human body sensing data to a server and to receive second space classification data from the server,
   wherein the controller is configured to, based on comparing the first space classification data with the second space classification data, determine a first blowing zone and a second blowing zone of the space and control operation of the air conditioner according to the first blowing zone and the second blowing zone,
   wherein the air conditioner further comprises an interface configured to receive an initialization instruction for deleting (i) the human body sensing data, the first space classification data, or the second space classification data that are stored in the air conditioner, and (ii) the human body sensing data or the second space classification data that are stored in the server,
   wherein the controller is configured to, in response to the initialization instruction, delete the human body sensing data, the first space classification data, or the second space classification data that are stored in the air conditioner, and
   wherein the air conditioner is configured to, in response to the initialization instruction, transmit a message for requesting deletion of the human body sensing data or the second space classification data that are stored in the server.

2. The air conditioner of claim 1, wherein the air conditioner is configured to:
   accumulate and store the human body sensing data generated by the controller; and
   based on an amount of the accumulated human body sensing data in the air conditioner being equal to a unit data amount for data transmission determined by the server, transmit the accumulated human body sensing data to the server.

3. The air conditioner of claim 2, wherein the air conditioner is configured to receive a value corresponding to the unit data amount for data transmission unit from the server, the value being determined by the server based on a number of air conditioners that access the server and transmit human body sensing data to the server.

4. The air conditioner of claim 2, wherein the controller is configured to, based on an amount of data transmitted by the air conditioner to the server being less than a server determination threshold, determine the first blowing zone and the second blowing zone using the first space classification data.

5. The air conditioner of claim 2, wherein the controller is configured to:
based on an amount of data transmitted by the air conditioner to the server being greater than or equal to a server determination threshold, compare the first space classification data with the second space classification data; and
based on a difference between the first space classification data and the second space classification data being less than or equal to a predetermined level, determine the first blowing zone and the second blowing zone using the second space classification data.

6. The air conditioner of claim 1, wherein the controller is configured to:
accumulate the human body sensing data; and
based on an amount of the accumulated human body sensing data being greater than or equal to a self-determination threshold, determine the first blowing zone and the second blowing zone using the first space classification data.

7. A server, comprising:
a controller configured to generate space classification data for classifying a space, in which each of a plurality of air conditioners is located, into two or more blowing zones based on the server receiving human body sensing data from the plurality of air conditioners; and
a storage configured to store the human body sensing data or the space classification data,
wherein the communication unitserver is configured to transmit the space classification data to the plurality of air conditioners, wherein the server is further configured to receive the human body sensing data from the plurality of air conditioners based on an amount of the human body sensing data being equal to a unit data amount for data transmission determined by the server, and
wherein the controller is configured to, (i) based on an air conditioner among the plurality of air conditioners receiving an initialization instruction for deleting the human body sensing data or the space classification data that are stored in the server, and (ii) based on the server receiving a message from the air conditioner for requesting deletion of the human body sensing data or the space classification data that are stored in the server, delete the stored data corresponding to the air conditioner from the storage.

8. The server of claim 7, wherein the controller is configured to determine a value corresponding to the unit data amount for data transmission based on a number of the plurality of air conditioners that transmit the human body sensing data to the server, and wherein the server is configured to transmit the value corresponding to the unit data amount for data transmission to the plurality of air conditioners based on predetermined intervals or based on an increase or a decrease of the number of the plurality of air conditioners that transmit the human body sensing data to the server.

9. The server of claim 7, wherein the controller is configured to, based on an amount of data received by the server from an air conditioner among the plurality of air conditioners being greater than or equal to a server determination threshold, generate the space classification data corresponding to the air conditioner.

10. A method for controlling an air conditioner, comprising:
generating human body sensing data from an image captured by a camera that is configured to capture one or more images of a space in which the air conditioner is located;
a generating, by a controller of the air conditioner, first space classification data for classifying the space into two or more blowing zones based on the human body sensing data and the image;
transmitting, by the air conditioner, the human body sensing data to a server, and receiving second space classification data from the server;
comparing, by the controller, the first space classification data with the second space classification data;
based on comparison of the first space classification data with the second space classification data, determining a first blowing zone and a second blowing zone of the space, and controlling operation of the air conditioner according to the first blowing zone and the second blowing zone;
receiving, by an interface, an initialization instruction for deleting (i) the human body sensing data, the first space classification data, or the second space classification data that are stored in the air conditioner, and (ii) the human body sensing data or the second space classification data that are stored in the server;
in response to the initialization instruction, deleting, by the controller, the human body sensing data, the first space classification data, or the second space classification data that are stored in the air conditioner; and
in response to the initialization instruction, transmitting, from the air conditioner, a message for requesting deletion of the human body sensing data or the second space classification data that are stored in the server.

11. The method of claim 10, further comprising:
accumulating and storing, by the air conditioner, the human body sensing data; and
based on an amount of the accumulated human body sensing data being equal to a unit data amount for data transmission determined by the server, transmitting the accumulated human body sensing data from the air conditioner to the server.

12. The method of claim 11, further comprising:
determining, by the server, a value corresponding to the unit data amount for data transmission based on a number of two or more air conditioners that access the server and transmit human body sensing data; and
receiving, by the air conditioner, the value from the server.

13. The method of claim 11, further comprising:
determining an amount of data transmitted by the air conditioner to the server; and
based on the amount of the data transmitted by the air conditioner to the server being less than a server determination threshold, determining the first blowing zone and the second blowing zone using the first space classification data.

14. The method of claim 11, further comprising:
determining an amount of data transmitted by the air conditioner to the server;
based on the amount of the data transmitted by the air conditioner to the server being greater than or equal to a server determination threshold, comparing the first space classification data with the second space classification data; and
based on a difference between the first space classification data and the second space classification data being less than or equal to a predetermined level, determining the first blowing zone and the second blowing zone using the second space classification data.

15. The method of claim 10, further comprising:
accumulating, by the controller, the human body sensing data; and
based on an amount of the accumulated human body sensing data being greater than or equal to a self-determination threshold, determining the first blowing zone and the second blowing zone using the first space classification data.

16. The method of claim 10, wherein each of the first space classification data and the second space classification data includes at least one of a distance between the air conditioner and each of the first blowing zone and the second blowing zone, or a span angle of each of the first blowing zone and the second blowing zone with respect to the air conditioner.

17. The method of claim 10, further comprising:
operating one or more blowers to blow air to the first blowing zone and the second blowing zone in different air speeds.

* * * * *